A. S. MANN.
DEVICE FOR MEASURING GASES.
APPLICATION FILED SEPT. 30, 1907.

996,498.

Patented June 27, 1911.

Witnesses:
Lloyd C. Bush
J. Ellis Glen.

Inventor:
Arthur S. Mann,
By Albert G. Davis
Atty.

UNITED STATES PATENT OFFICE.

ARTHUR S. MANN, OF SCHENECTADY, NEW YORK.

DEVICE FOR MEASURING GASES.

996,498.

Specification of Letters Patent. Patented June 27, 1911.

Application filed September 30, 1907. Serial No. 395,117.

*To all whom it may concern:*

Be it known that I, ARTHUR S. MANN, a citizen of the United States, residing at Schenectady, county of Schenectady, State of New York, have invented certain new and useful Improvements in Devices for Measuring Gases, of which the following is a specification.

My invention consists of a device for determining the proportion of free oxygen in gases, as for example, in the gases escaping from a furnace. Chemical analysis of the gases requires expensive and delicate apparatus, a skilled operator, and constant care. As considerable time is necessarily consumed in the analysis, the results obtained can show only what conditions existed at some past time. With the best apparatus now on the market at least a half hour is thus consumed. According to my present knowledge no other device exists which will indicate to the eye of the furnace man the completeness of combustion at any moment. My device accomplishes this result by mixing a given volume of furnace gases with some combustible gas, burning the mixture, and measuring the amount of heat resulting from said combustion. By this method very little time intervenes between the withdrawal of gas from the furnace and the indication of the result. The consequent advantage is obvious.

The novel features of my invention are pointed out in the appended claims.

My invention will be fully described by reference to the accompanying diagrammatic sketch.

Figure 1:
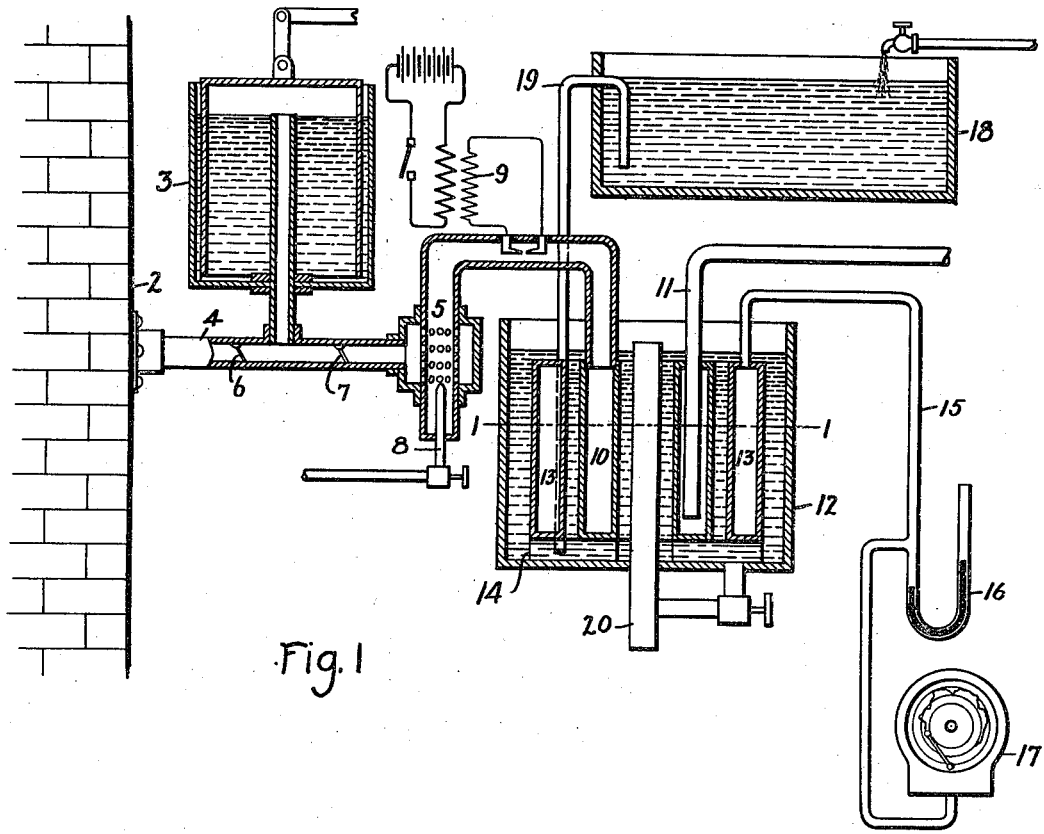
Figure 2:
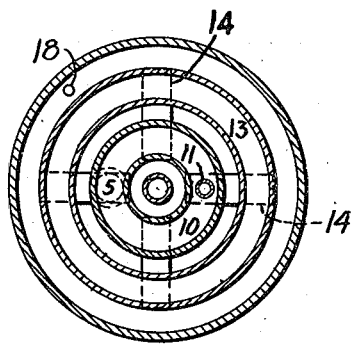

Figure 1 is a vertical section of my apparatus; and Fig. 2 shows a horizontal section through line 1 1 of Fig. 1.

Like numbers indicate identical parts.

The furnace gases to be treated are drawn, for example, from the flue 2 by means of a suitable pump such as 3 through a pipe 4, and introduced into a combustion chamber 5. A valve 6 prevents a back flow of gas to the flue on the downward stroke of the pump, while a valve 7 prevents gas from being withdrawn from the combustion chamber on the return stroke of the pump. I have found about one change in one and one-half minutes to be an effective rate of operation of the pump. A much larger volume of gas is withdrawn for this test than was needed for the chemical analysis, hence the percentage of error from incidental losses is minimized. In the chamber 5, the furnace gas is mixed with an excess of some combustible gas, as hydrogen, issuing from a pipe 8 at a constant rate. Other combustible gases than hydrogen, of course, may be used. The gas mixture is ignited by means of a spark from an induction coil 9 energized by batteries or by any other well-known means. A continuation of combustion chamber 5 conducts the hot gas mixture after the combustion has taken place, into a heat-absorbing chamber 10. It eventually escapes into the atmosphere by a pipe 11. Chamber 10 is inclosed in the container 12 and entirely surrounded by water. This water serves to absorb heat from the hot gases. The circular concentric chamber 13 is filled with air. The arrangement of these chambers is shown in a plan view in Fig. 2. The dotted lines 5 indicate the extension of the combustion chamber which communicates with 10, and opposite at 11 is shown the exhaust pipe which communicates with the atmosphere. The dotted lines 14 show supports for the gas chamber 10 and the air chamber 11. As the absorbing water entirely surrounds both chambers 10 and 13 an active circulation of the water with rapid absorption of heat is possible. The heat is communicated to the air chamber 13 by conduction, and serves to expand the air contained in the same. A tube 15 leads from the air chamber 13 to a manometer 16. Chamber 13 and tube 15 act as an air thermometer and are influenced by changes in the temperature of the surrounding water. Small changes of temperature will produce correspondingly large fluctuations in the height of manometer level because of the large coefficient of expansion of air. These fluctuations will serve as a ready means for observing the relative quantities of heat produced by the combination of the oxygen with the combustible gas or compared with the heat produced by a mixture containing a known amount of oxygen. A recording gage 17 communicating with 15 serves to furnish a permanent and accurate record of the fluctuations. The operation of this kind of gage is well known and will need no description here. With each succeeding combustion of the mixed gases in the combustion chamber an additional amount of heat will, of course, be carried over into the chamber 12 for absorption, causing an expansion of the air in 13, and a successive change in the level of the manometer. The rise of temperature resulting from any one combustion will be little or great as the amount of heat resulting is little or great. This successive expansion of the air in the air thermometer will indicate optically how the furnace is running. The recording gage will furnish a permanent record.

As the operation of the apparatus depends upon the absorption of the heat by the water or other fluid resulting from the burning gases, the absorbing fluid must be kept at a lower temperature than the gases resulting from the combustion. An automatic change of water in the chamber 12 is therefore provided for by the following means: Water flows at a constant rate into the tank 18 which is situated at a level above that of the chamber 12. The tank 18 communicates by means of a siphon 19 with the container 12. When the water in the tank 18 rises to a sufficient height, it will siphon over into the container 12 entering at the bottom of said container. A rise of the level of water in the container 12 will cause an overflow through the pipe 20 as fast as the water is displaced. The cold water will thus displace the hot water. The rate of flow of water into the tank 18, the diameter of the siphon and size of the supply tank 18 are adjusted by trial to the conditions prevailing. It is my object to obtain relative results to indicate a change of conditions by indicating the variations in the percentage of oxygen in the flue gas.

What I claim as new and desire to secure by Letters Patent of the United States, is,—

1. The combination of a combustion chamber, means for introducing at intervals gas samples of definite volume and a combustible gas into this chamber, means for igniting the mixture, a heat absorbing chamber, and means for automatically registering the relative amount of absorbed heat.

2. The combination of a combustion chamber, means for introducing gas samples and a combustible gas into said chamber, a sparking ignition device, a heat absorbing chamber surrounded by water, an air chamber also surrounded by this water, and a manometer connected with said air chamber.

3. The combination of means for burning a mixture of combustible gas and furnace gas, with a heat-absorbing chamber consisting of a liquid containing vessel, a gas receiver surrounded by liquid, a thermometer likewise immersed in this liquid and means for replacing the liquid at the end of regular intervals.

4. The combination of means for burning a mixture of combustible gas and the oxygen in furnace gas, a heat absorbing chamber consisting of gas and air chambers surrounded by a liquid, and automatic means for periodically changing the liquid in said heat absorbing chamber.

5. A method of determining the oxygen content of a gas, which consists in mixing a known volume of said gas with a combustible gas of constant calorific value, burning the mixture, and measuring the amount of heat liberated.

6. The combination of a combustion chamber, means for mixing samples of an oxygen containing gas at regular intervals with a combustible gas in said chamber, means for igniting the mixture, and means for relatively indicating the quantity of heat developed.

7. In a calorimeter, the combination of a heat-absorbing chamber containing a liquid, a combustion chamber immersed in the liquid, a concentric air chamber likewise immersed in said liquid, and means for recording the variations of pressure of the air in said air chamber.

In witness whereof, I have hereunto set my hand this 27th day of September, 1907.

ARTHUR S. MANN.

Witnesses:
  BENJAMIN B. HULL,
  HELEN ORFORD.